United States Patent [19]

Thompson

[11] 4,342,129
[45] Aug. 3, 1982

[54] WIPING INSERTS FOR WINDSHIELD WIPERS, SQUEEGEES AND THE LIKE

[76] Inventor: William E. Thompson, R.R. 1, Box 89, Middletown, Ind. 47356

[21] Appl. No.: 180,044

[22] Filed: Aug. 21, 1980

[51] Int. Cl.³ .............................................. B60S 1/38
[52] U.S. Cl. .................. 15/250.4; 15/250.36; 15/250.42
[58] Field of Search ............ 15/250.33, 250.36, 250.42

[56] References Cited

U.S. PATENT DOCUMENTS

| | | |
|---|---|---|
| D. 213,100 | 1/1969 | Rickett . |
| 1,753,651 | 4/1930 | Gillet . |
| 1,771,824 | 7/1930 | Storrie . |
| 1,786,457 | 12/1930 | Sarver . |
| 1,816,370 | 7/1931 | Hachenberg . |
| 1,888,843 | 11/1932 | Anderson . |
| 2,179,451 | 11/1939 | Horton ............................... 15/250.4 |
| 2,322,312 | 6/1943 | Osborn ......................... 15/250.36 X |
| 2,537,411 | 1/1951 | Klinger . |
| 2,550,504 | 4/1951 | Vidrick et al. . |
| 2,920,336 | 1/1960 | Anderson ......................... 15/250.42 |
| 3,099,031 | 7/1963 | Ludwig ......................... 15/250.36 X |
| 3,104,412 | 9/1963 | Hinder ............................. 15/250.42 |
| 3,238,555 | 3/1966 | Cels ............................... 15/250.36 X |
| 3,418,676 | 12/1968 | Byczkowski . |
| 3,418,679 | 12/1968 | Barth et al. . |
| 3,820,188 | 6/1974 | Moorhead ......................... 15/250.42 |
| 3,903,560 | 9/1975 | Jewell et al. ................... 15/250.36 X |

FOREIGN PATENT DOCUMENTS

| | | |
|---|---|---|
| 2501903 | 7/1976 | Fed. Rep. of Germany . |
| 2627832 | 1/1978 | Fed. Rep. of Germany . |
| 854398 | 1/1940 | France ............................... 15/250.4 |
| 7345100 | 4/1975 | France . |
| 7606034 | 10/1976 | France . |
| 461560 | 2/1937 | United Kingdom . |
| 689559 | 4/1953 | United Kingdom . |
| 1319976 | 6/1973 | United Kingdom . |
| 1442986 | 7/1976 | United Kingdom ............. 15/250.36 |
| 2044161 | 10/1980 | United Kingdom . |
| 289029 | of 1971 | U.S.S.R. . |

*Primary Examiner*—Peter Feldman
*Attorney, Agent, or Firm*—Woodard, Weikart, Emhardt & Naughton

[57] ABSTRACT

A windshield wiping insert for windshields, windows, and the like includes an intermediate, elongated, formed metal strip which provides the interface between the superstructure of the windshield wiper and the flexible wiping member which is placed in direct contact with the window surface to be wiped or cleaned. This intermediate support strip includes a pair of outwardly extending flanges which are adapted to be slidably received by the particular super structure and between these flanges is a center channel wherein a portion of the flexible wiping member is clamped and securely retained. Another portion of the flexible wiping member protrudes downwardly beyond the lower surface of the intermediate support strip and terminates in an enlarged quadrant shaped portion which is configured with two edges and a convex curved surface therebetween. With movement of the windshield wiper assembly, this enlarged portion flexes first in one direction then in another and the amount of flexing or bending is controlled so as to present one edge or the other edge in contact with the windshield surface so that a scraping action occurs as the windshield wiper moves across the window. The intermediate support strip is initially formed with a convex shape in its length dimension in order to provide improved force distribution along the wiping edge of the windshield wiper.

5 Claims, 3 Drawing Figures

WIPING INSERTS FOR WINDSHIELD WIPERS, SQUEEGEES AND THE LIKE

BACKGROUND OF THE INVENTION

This application relates in general to flexible window wiping apparata and in particular to windshield wiper inserts.

While the descriptions and discussions which follow generally focus on windshield wiper inserts, it is to be understood that the types of wiping inserts disclosed herein could also be adapted for use with squeegees and related window or surface cleaning (wiping) apparata. The decision to focus on windshield wipers in the descriptions which follow is based upon their wide spread, if not universal, use and the number of short comings and disadvantages of current designs. Further, the inability of a driver to adjust or correct the performance of the windshield wipers, suggests a very significant need for some type of new design which will perform reliably and thoroughly clean the window without creating annoying sounds or vibrations.

Windshield wiper designs generally depict a certain commonality of approaches to a fairly basic task. The majority of windshield wipers includes some type of superstructure, an intermediate support strip and some type of flexible wiping insert. While a moderate degree of sophistication has been achieved in the design of the superstructure and the driving mechanisms for the windshield wiper blades, the flexible inserts are generally of the same basic style. This particular style provides a triangular cross sectional shape which tapers to a fairly thin lip at its point of contact with the surface of the windshield. The frequently found problems with this type of design are the inability to thoroughly wipe the window at all areas of contact with the wiper blade (possibly due to insufficient force or wear of the blade), a rapid rate of wear or deterioration of this thin lip and the creation of annoying sounds and vibrations.

The following listed patents each disclose concepts associated with windshield wipers, yet each reference does virtually nothing to improve the design of the insert.

| Pat. No. | Patentee | Issue Date |
|---|---|---|
| 3,879,794 | Roberts, Jr. | 4/29/75 |
| 3,866,261 | Stratton | 2/18/75 |
| 3,820,188 | Moorhead et al. | 6/28/74 |
| 3,885,265 | Deibel et al. | 5/27/75 |
| 3,418,679 | Barth et al. | 12/31/68 |
| 3,619,556 | Deibel et al. | 11/09/71 |
| 3,879,793 | Schlegel | 4/29/75 |
| 4,007,511 | Deibel | 2/15/77 |
| 3,418,676 | Byczkowski | 12/31/68 |
| 3,618,155 | Mower | 11/09/71 |
| 4,126,911 | Mohnach et al. | 11/28/78 |
| 289,029 | Foreign (Russia) | 1971 |
| 1,753,651 | Gillet | 4/08/30 |
| 1,816,370 | Hachenberg | 7/28/31 |
| 1,888,843 | Anderson | 11/22/32 |
| 2,772,435 | Louk | 12/04/56 |
| 2,537,411 | Klingler | 1/09/51 |

These patents, although somewhat excessive in number, can be generally grouped into three different categories for the purpose of discussion at this time. The first category includes disclosures relating generally to the interface between the superstructure and the wiping portion of the windshield wiper blade. Those patent disclosures which relate to this concept, although quite varied in certain respects, are grouped together due to the fact that their flexible wiping element is consistently of one type of design. This one consistent type of design is in fact a flexible wiping element which tapers inwardly as it extends downwardly to its point of contact with the outer surface of the windshield. Due to the fact that the invention disclosed herein is drastically different from this common triangular cross section approach, it is not believed necessary to fully discuss each of the aspects of each of the patents in this first group. The patent numbers corresponding to this first group or category are the following:

U.S. Pat. Nos.
3,879,794 3,866,261 3,820,188 3,885,265 3,619,556
3,879,793 4,007,511 3,618,155 4,126,911

The second group of listed patents are those which focus more on different concepts regarding the flexible wiping element. Each of the listed patent references which have been placed into this group are discussed individually hereinafter.

Klingler discloses a wiper for curved windshields wherein the wiper blade is constructed from felt, rubber or other appropriate material and is fitted in a rigid backing or holder. This blade is cut along opposite sides with a stair-stepped configuration and is partially slit into a series of laminations for the apparent purpose of following or sliding across the glass with better contact.

Anderson discloses an apparatus and method for manufacturing windshield wiper blades. The blade insert includes a wiping portion which is in the form of an enlarged head having a plurality of longitudinal wiping edges and a longitudinal cylindrical bead portion which is to be anchored into a channel of a U-shape metal holder.

Hachenberg discloses a window cleaning device wherein the wiping element includes a tubular portion disposed between two relatively thin, flat strips which radiate on opposite sides of the tubular portion. This tubular portion apparently serves as a type of backing or resistance member to control the deflection or bending of either strip as the wiper moves in one direction and then the other.

Gillet discloses a windshield wiper wherein a plurality of lamination strips are secured together and held by means of a metal holder. These lamination strips include an outer pair of long strips and an inner pair of shorter strips and a reinforcing element which is disposed between the pair of shorter strips and is infact shorter than those shorter strips.

The Russian patent discloses a windshield wiper concept wherein the wiping element includes two outwardly extending arms or wiping portions and is configured with a concave surface therebetween so as to provide a clearance void between the windshield and the wiping element. This clearance void is also centrally located between the two contacting surfaces. This clearance void is used for the introduction of a washing or cleaning solution.

Byczkowski discloses a windshield wiper and washer system and although much of the disclosure relates to the superstructure and the driving mechanism, of interest to this particular invention is the configuration of the wiping element. The wiping element includes three passages that extend longitudinally and these passages are supplied with a liquid and include longitudinally spaced slits. As this wiping element (blade) bends or deflects first in one direction and then the other, these longitudinally spaced slits in the lower most passage permit the liquid to be directed in small jets outwardly against the windshield.

Barth et al. discloses a windshield wiper wherein the wiping element includes a smaller protruding portion which is used for the actual wiping and a much larger portion which is retained within an intermediate support strip. Of interest here are the particular geometric configurations for the wiping insert and the analysis of the advantages or disadvantages of the windshield wiper operation for each of these particular geometric shapes.

Finally, group three includes one reference to a curved surface wiper, such as a squeegee, and this is the Louk patent reference. The purpose to include a discussion of this reference is for the purpose of explaining that wiper inserts (flexible wiping members) can be adapted to other apparata and are not limited solely to use with conventional windshield wipers.

It is also important to note that the patent references listed are believed to be the most relevant to the invention set forth herein, yet there are a large number of similar or related patent references which disclose flexible wiping members of the type found in the listed patent references. In this regard, it is instructive to realize that none of the references in this large body of prior technology even remotely suggest the type of insert design which is described herein as part of the present invention. What is quite clear from the foregoing list of reference is that the entire teaching in the area of windshield wiping design involves the use of a flexible protruding portion which tapers to a narrow lip. The only reference which does not appear to follow this designing scheme is the Russian reference and yet, it too even involves the tapered tip idea only that there are two tips as part of one insert. This type of narrow lip or tapering tip design not only allows too much flexibility, its thinness results in fairly rapid wear to the windshield wiper insert. Although frequent replacement of such consumable items may be of interest to the manufacturer, it clearly does not represent the optimal design. Further, these windshield wipers work on the theory of bending this lip, first in one direction and then in another, and it is the side surface of this lip which wipes the windshield. An improvement to this type of wiper insert would be to configure the wiping surface as an edge in order to scrape the window rather than slide across it. By providing two edges, one for each direction of movement, and a rolling surface therebetween, there would not be the need for a flip-flop of the lip at each end point of the wiper's path. The present invention provides each of these forgoing improvements as well as other benefits and advantages as will be apparent from the descriptions which follow.

SUMMARY OF INVENTION

A wiping apparatus for windshields, windows, and the like, wherein the wiping apparatus is received and retained by a superstructure arrangement, according to one embodiment of the present invention comprises a flexible wiping member having a first wiping edge for wiping in one direction and a second wiping edge for wiping in an opposite direction, each of the edges being defined by a separate substantially flat surface in combination with a curved surface, the curved surface extending from the first wiping edge to the second wiping edge, and an interfacing member arranged for receipt by the superstructure and retaining the flexible wiping member, the interfacing member having two opposite, laterally extending arms, each arm being adjacent a different one of the substantially flat surfaces, the arms being designed and arranged to permit a controlled amount of flexible movement of the flexible wiping member in order to alternately position the edges contiguous to the surface to be wiped by the wiping apparatus.

A windshield wiper insert suitably arranged for receipt by the superstructure of a conventional windshield wiper blade assembly, according to another embodiment of the present invention comprises an elongate guide strip member suitably designed and arranged for receipt by the superstructure, and an elongate, flexible wiping member having a first section secured within the elongate guide strip member and having a second section laterally protruding beyond the superstructure, the second section including an enlarged wiping portion having a quadrant shaped lateral cross section.

One object of the present invention is to provide an improved windshield wiper insert.

Related objects and advantages of the present invention will be apparent from the following descriptions.

DESCRIPTION OF THE PREFERRED EMBODIMENT

Figure 1:
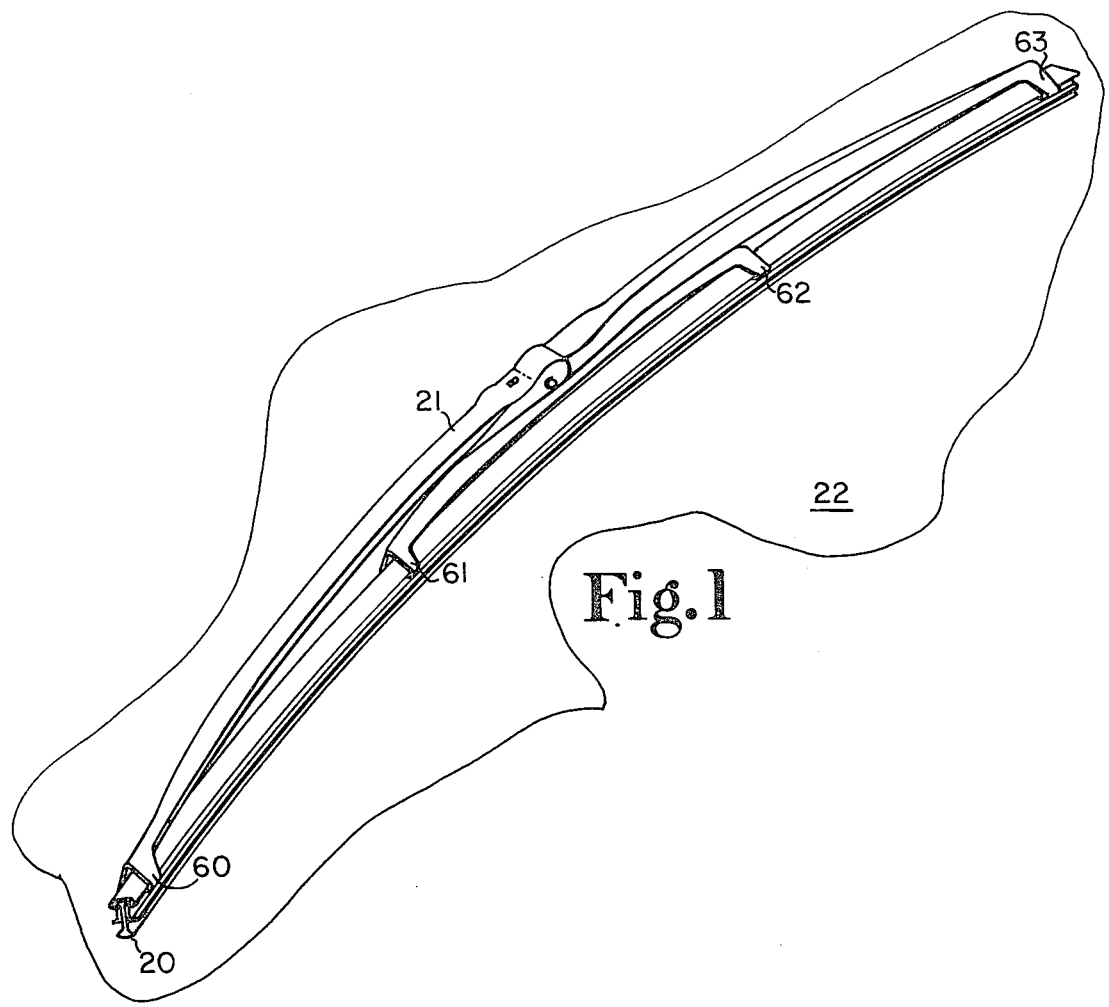
FIG. 1 is a perspective view of a windshield wiper insert installed within a windshield wiper superstructure according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1A:
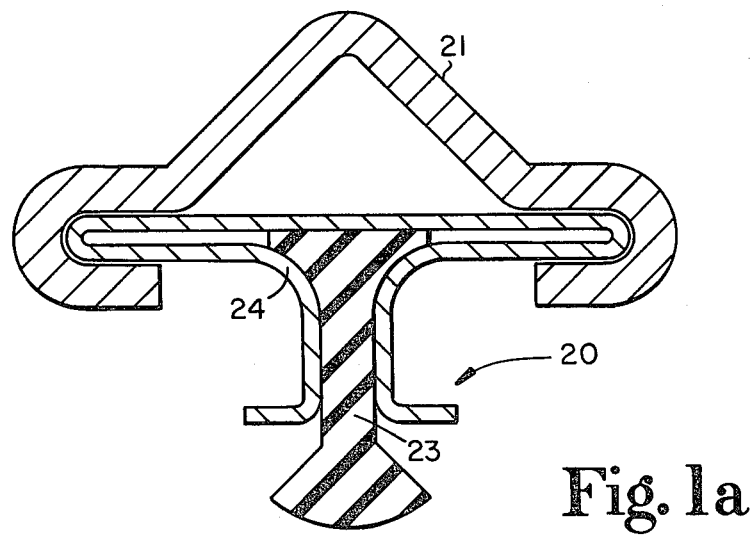
FIG. 1a is a front elevation view of a lateral cross section of the FIG. 1 windshield wiper insert.

Referring to FIGS. 1 and 1a there is illustrated windshield wiper insert 20 which is securely retained by superstructure 21 in a typical manner so that the flexible wiping portion of the insert is placed in contact with the outer surface of windshield 22. While a variety of superstructure configurations are known to exist, it is to be noted that the teachings of the present invention are equally applicable to virtually every conventional windshield wiper superstructure with only minor dimensional modifications possibly being required.

Figure 2:
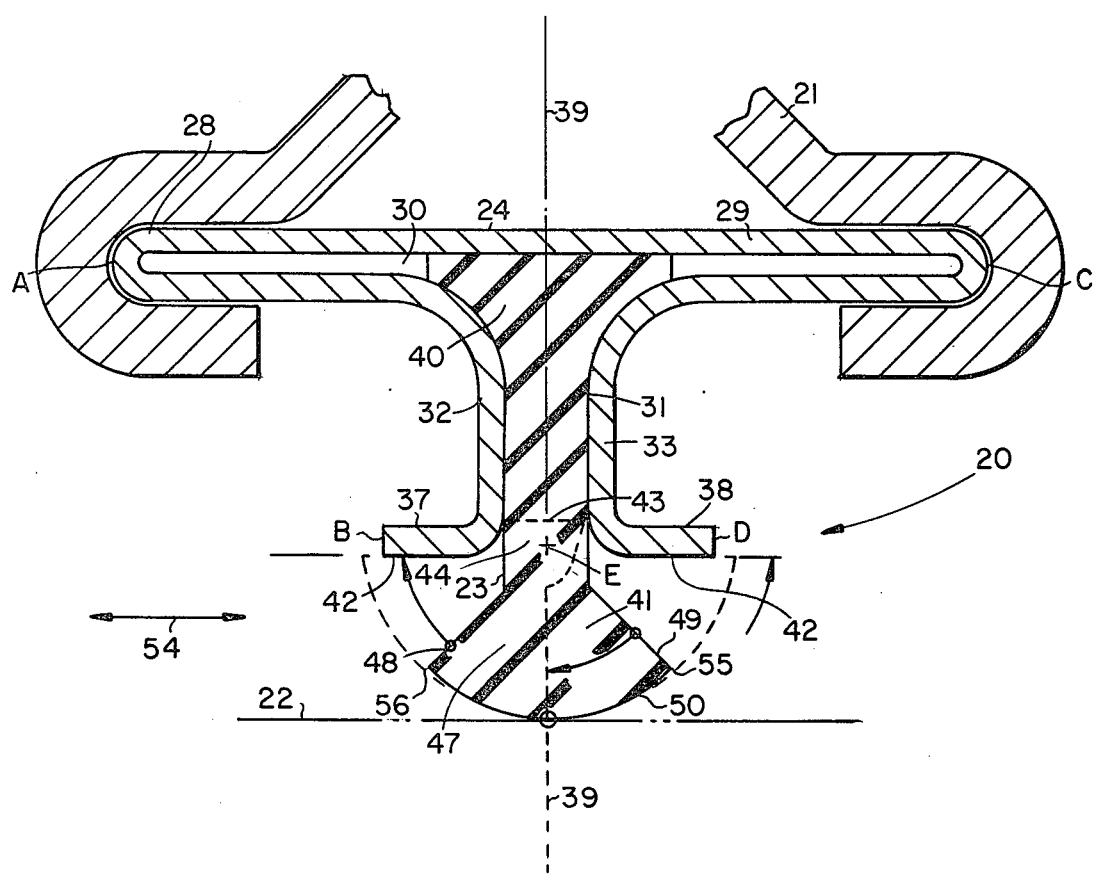
FIG. 2 is a front elevation view of a lateral cross section taken through the FIG. 1 windshield wiper insert and detailing additional aspects of the present invention.

Referring to FIGS. 1a and 2 the assembly of insert 20 to superstructure 21 is illustrated. Since these figures are each a front elevation view of the lateral cross section taken through insert 20, the specifics of the geometry of the flexible wiping member 23 and intermediate support strip 24 are clearly shown. FIG. 1a is provided adjacent FIG. 1 for an appreciation of the cross sectional shape.

FIG. 2 is thereafter relied upon for a discussion of specific details.

Intermediate support strip 24 is a formed metal strip which extends for virtually the entire length of insert 20. The forming operation by which the support strip is made initially results in a shape slightly altered from that illustrated, yet after insertion of member 23, the illustrated shape is achieved. This variation in shape and assembly procedure will be discussed in greater detail hereinafter.

Figure 3:
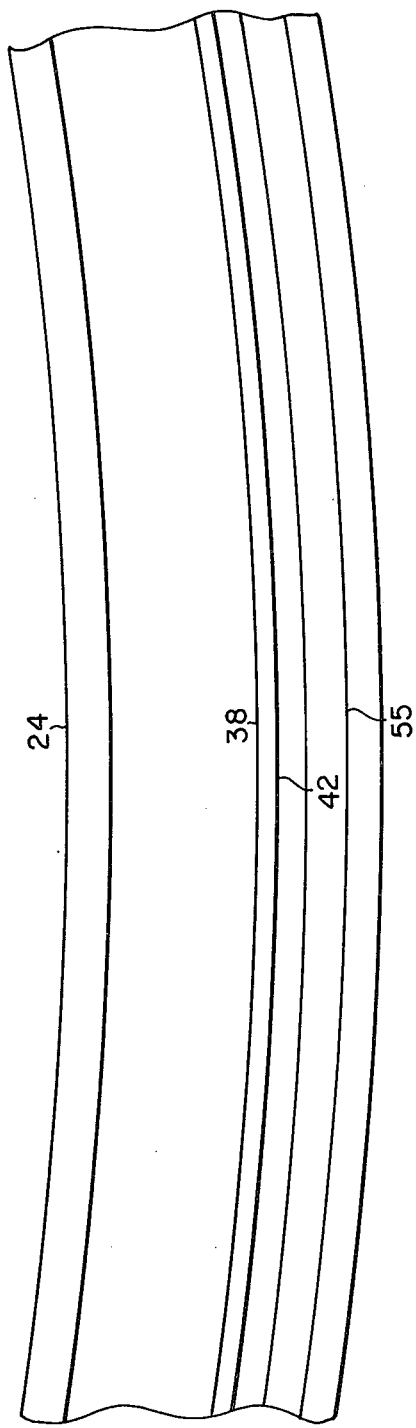
FIG. 3 is a side elevation view of the FIG. 1 windshield wiper insert illustrating its convex curvature.

Intermediate support strip 24 includes a first laterally extending flange 28, an opposite, laterally extending flange 29 and a shelf 30 internal thereto and extending therebetween. Shelf 30 opens into a center channel 31 which is defined by side wall portions 32 and 33. At their lower most ends, each side wall portion 28 and 29 flares outwardly into a corresponding laterally extending flange 37 and 38 respectively. Flanges 28 and 37, and flanges 29 and 38 are all substantially parallel to each other and intermediate support strip 24 is symmetrically configured about vertical centerline 39. It is also to be noted inasmuch as FIGS. 1a and 2 are lateral cross sections that the geometry of intermediate support strip 24 and flexible wiping member 23 extend virtually the full or entire length of the windshield wiper with the same cross sectional shape as illustrated. It is to be noted that intermediate support strip 24 is generally arranged with a type of I-beam shape. This particular shape, as opposed to a flat strip, provides linear stiffness when initially formed into a convex curved shape in its length dimension (see FIG. 3). This linear stiffness enables an improved force distribution over the wiping edge of the windshield wiper as will be described in greater detail hereinafter.

In the initial forming operation of the intermediate support strip, that section of the intermediate support strip from point A to point B is oriented in a slightly different configuration from that illustrated. This initial orientation can best be visualized by imagining that this section is pivoted inwardly and upwardly with point A as the pivot location. This action partially closes shelf 30 and reduces the width of center channel 31. A similar occurence takes place with the section of the intermediate support strip from point C to point D. With this form initially created, the flexible wiping member is installed next. By forceably separating the two sections so as to open up center channel 31, sufficient clearance is provided so that the flexible wiping member can be inserted. This forceable separation induces only elastic deformation in the intermediate support strip and when the separating pressure is released, the sections move back together and thereby create the configuration shown in FIGS. 1a and 2. The intermediate support strip does not return to its initially formed shape, but it would if not resisted by the presence of the flexible wiping member. The result then is a very tight and rigid assembly of the flexible wiping member and the intermediate support strip relying solely on their interference fit.

Returning briefly to the earlier reference about the slide fit of the intermediate support strip into the superstructure. Since this fit is governed by the length between points A and C, and the thickness of flanges 28 and 29, it is to be understood that these dimensions can be easily revised at the time of the initial forming operation and variations of this type do not pose any major obstacles to the adaptation of this invention to a different superstructure size or shape. However, since most superstructures are of a "universal" configuration, variations will be minimal.

Flexible wiping member 23 can be thought of as being configured into two sections. Upper section 40 is that part clamped and retained by the intermediate support strip. Lower section 41 is that part protruding beyond lower surface 42 of flanges 37 and 38. Broken line 43 can be considered as a suggested dividing line between these two sections, but this division is really only of interest for the discussion herein since member 23 is a single, integral member. Flexible wiping member 23 is constructed from a suitable elastomeric compound of the type typically employed with windshield wiper applications. The wide variety of rubber and rubber compounds need not be itemized at this point since it is understood that variations in material are considered to be within the ordinary skill in the art.

Lower section 41 of flexible wiping member 23 begins with a generally rectangular portion 44 and then flares into a quadrant shaped area, now defined as lower portion 47. Lower portion 47 is defined by two opposite, substantially flat surfaces 48 and 49 and a convex curved surface 50 extending therebetween. Surface 50 is disposed in contact with windshield 22 when the flexible wiping member is properly retained within the intermediate support strip and when the intermediate support strip is properly received by the superstructure. The illustration of FIG. 2 represents a static or at rest condition wherein the center location (mid point) of curved surface 50 is in line contact with the outer surface of the windshield. By extending the lines representing surfaces 48 and 49 upwardly and inwardly, their intersection occurs at point E and creates an included angle of 90 degrees. This then creates the quadrant shape of portion 47 referred to above.

Due in part to the fact that the rectangular portion 44 of the flexible wiping member extends below surface 42 and due in part to the geometric shape of portion 47, clearance is left on each side between surface 42 and surfaces 48 and 49, respectively. In fact, due to the symmetry of the intermediate support strip and the symmetrical nature of the flexible wiping member, these two clearance regions are virtually identical. Another very relevant fact which is evident from FIG. 2 is that the included angles between the centerline 39 and surfaces 48 and 49, respectively, are each 45 degrees. Similarly, the included angles between surfaces 48 and 49 and surface 42 are also each 45 degrees. This result is related to the fact that surface 42 and centerline 39 are substantially perpendicular to each other. The dynamic results and benefits achieved from this particular arrangement and geometry, are discussed further hereinafter.

As the windshield wiper is operated, it moves back and forth across the windshield, and this back and forth movement can be thought of as following the directions of arrow 54. As this movement occurs, surface 50 is pulled across the windshield. By fabricating member 23 of a rubber compound with a degree flexibility, the drag due to the windshield is greater than the resistance to bending or flexing at rectangular portion 44. Consequently, lower portion 47 flexes in a direction opposite to the direction of movement. This flexing occurs very quickly and almost immediately after energizing the windshield wipers, surface 48 (or 49) flexes and is placed in contact against its corresponding portion of surface 42. In this regard, surface 42 acts as a stop surface to the continued flexing of portion 47. When the windshield wiper changes direction, the same occurrence takes place on the opposite side. This type of flexing and rolling action of member 23 prevents the flip-flop of a thin lip, which is a disadvantage of conventional windshield wiper inserts.

While the dynamics of the operation have been described, it is to be noted that an additional benefit results. As will be recalled, the semi-cylindrical region defined by surface 50 and surface 42 was segmented into four sectors of 45 degrees each. Thus, when surface 48 contacts surface 42, edge 55 is positioned at or at least quite close to the location on the windshield corresponding to centerline 39 and is in direct contact with windshield 22 at that point. Similarly, when surface 49 contacts surface 42, edge 56 is positioned at or at least quite close to that same centerline location on the windshield. The result is a wiping action that effectively scrapes the surface of the windshield with an edge. While this is quite effective on rain, there is also a significant advantage when frost or ice has collected on the windshield. This type of insert and the fact that a sharp edge scrapes the windshield facilitates the removal of frost and ice deposits without allowing the flexible wiping member to ride up and over these deposits.

The size and mass of portion 47 presents a drastic departure from current windshield wiper insert concepts. There are not any flimsy, thin lips to deal with and significant pressure can be applied without any difficulties. There are no annoying sounds or vibrations due to a flip-flop of the lip or incomplete wiping action. The windshield wiping action created by this invention is quite clean and thorough. Although the particular structure disclosed in the foregoing description does in fact facilitate the application of more significant pressure levels, this alone does not always insure complete contact with the wiping portion against the windshield.

As can be visualized from FIG. 1 there are primarily four pressure points 60-63 associated with typical windshield wiper superstructures. These four pressure points represent the points of maximum pressure applied by the superstructure through the intermediate support strip to the flexible wiping member. It has been found that this particular arrangement allows a certain degree of pulling or separation between the wiping member and the windshield. In order to resolve this problem, the intermediate support strip and the flexible wiping member disclosed herein are formed or initially configured with a convex shape as set forth in FIG. 3. This convex shape is in fact convexed from the side of the wiping element yet concaved from the side of the intermediate support strip. By being initially formed and assembled with this type of curvature there is a more uniform contact with the surface of the windshield once this insert is assembled into the corresponding windshield wiper superstructure. It has been found that this particular curvature when assembled within the superstructure provides a distribution of the forces at points 60-63 of FIG. 1 uniformly along the length of the wiping edge. The redistribution of force by this curvature is able to be accommodated and effectively utilized due to the improved and novel style of the flexible wiping member.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A windshield wiper insert suitably arranged for receipt by the superstructure of a conventional windshield wiper blade assembly for wiping a windshield, said windshield wiper insert comprising:

an elongate guide strip member suitably designed and arranged for receipt by said superstructure;

an elongate, flexible wiping strip having a first section secured within said elongate guide strip member and having a second section laterally protruding beyond said elongate guide strip, said second section including an enlarged wiping portion having a sector shaped lateral cross section including two substantially flat sides corresponding to the radii of said sector shaped lateral cross section and a continuous and uniformly curved surface having a circular arc shape and extending between said two sides and defining a corresponding edge at each intersection of said curved surface and each side; and means located directly above said two flat surfaces for controlling the movement of said enlarged wiping portion, said means adapted to alternately contact each of said flat surface to position one edge and then the other edge at a point of contact against said windshield as said windshield wiper is operating.

2. The windshield wiper insert of claim 1 wherein said means for controlling includes a pair of outwardly extending arms disposed as part of said guide strip member and positioned above said second section, said arms being suitably arranged to serve as stops to continued flexing of said wiping strip when said windshield wiper is operating.

3. The windshield wiper insert of claim 2 wherein said elongate guide strip member includes an open channel and said first section is disposed within said open channel.

4. The windshield wiper insert of claim 1 wherein said guide strip further includes a center channel arranged to retain a portion of said flexible wiping member with an interference fit, said guide strip having two outwardly extending flange portions for a slide fit assembly with said superstructure.

5. A wiping apparatus for windshields, windows, and the like, wherein the wiping apparatus is received and retained by a superstructure arrangement, said wiping apparatus comprising:

an elongate support strip member suitably designed and arranged for receipt by said superstructure, said elongate support strip member having two laterally extending arm portions which define a first included angle therebetween; and a flexible wiping member symmetrically positioned relative to said elongate support strip member and securely received therein and having a first wiping edge for wiping in one direction and a second wiping edge in an opposite direction, each of said edges being defined by a separate substantially flat surface in combination with a curved surface, said curved surface extending from said first wiping edge to said second wiping edge, said two substantially flat surfaces defining a second included angle which is substantially one-half the size of said first included angle, each of said laterally extending arm portions being adjacent a different one of said substantially flat surfaces and adapted to control the movement of said flexible wiping member.

* * * * *